Sept. 29, 1959 F. H. BRAY ET AL 2,906,888

ELECTRICAL COUNTING CIRCUITS

Filed Oct. 1, 1953

Inventor
F. H. BRAY- R.G.KNIGHT

By Robert Harding Jr.
Attorney

United States Patent Office 2,906,888

Patented Sept. 29, 1959

2,906,888

ELECTRICAL COUNTING CIRCUITS

Frederick Harry Bray and Ronald George Knight, London, England, assignors to International Standard Electric Corporation, New York, N.Y.

Application October 1, 1953, Serial No. 383,614

Claims priority, application Great Britain October 9, 1952

6 Claims. (Cl. 307—88.5)

The present invention relates to electrical counting circuits using crystal triodes.

According to the present invention there is provided an electrical counting circuit comprising a single crystal triode for each stage of said circuit, each said crystal triode being so arranged as to be bistable, having an "on" state and an "off" state, a common pulse input over which pulses are applied in common to all of said crystal triodes, and means interconnecting the crystal triodes of each consecutive pair responsive to the first crystal triode of said pair assuming its "on" state to prepare the second crystal triode for operation from its "off" state to its "on" state in response to the next pulse, whereby each received pulse causes the crystal triode following the last-operated crystal triode to assume its "on" state.

The invention will now be described with reference to the accompanying drawings, in which.

Figure 2:
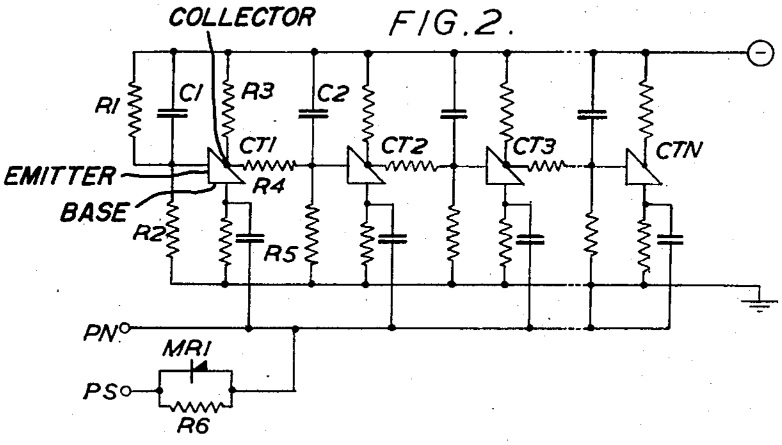
Fig. 2 is a first embodiment of the invention.

The explanatory circuit of Fig. 1 will first be described. It represents a crystal triode, shown as a right-angled triangle in which the hypotenuse represents the collector electrode, the vertical side represents the emitter electrode, and the horizontal side represents the base electrode. These electrodes are respectively designated C, E, B, in Fig. 1. When a current-gain crystal triode is used in a circuit, such as Fig. 1, it has been found that if the conditions are correct the triode has two stable states, one being a high current state and the other being a low current state.

If the emitter E is sufficiently negatively biased with respect to the base B, then the crystal triode will remain indefinitely in the low current or "off" condition. In this condition the crystal triode is operating in a region in which there is little or no current gain between collector current and emitter current.

However, if the emitter voltage is increased by applying a positive bias to the emitter, the emitter-base current increases. If the applied voltage is large enough to take the crystal triode into the region in which there is current gain, i.e. where the collector-base current increases more than does the emitter-base current, and the current gain and the magnitude of the emitter-base current are sufficient, there will be a further rise in the emitter-base voltage. This further voltage rise is a positive feedback effect, and is due to the excess of the collector-base current over the emitter-base current. This positive feedback will cause a corresponding increase in collector current, which will further increase the feedback, which will again increase the collector current. Hence a cumulative action occurs until the current gain portion of the characteristic of the crystal triode has been passed. The crystal triode is now operating in a region of low or zero current gain and is passing a high current. The emitter potential due to feedback is adequate to maintain the triode in this state even after removal of the input potential which caused the crystal triode to be triggered to this high current state.

Thus a suitable positive potential applied to the emitter triggers the crystal triode from its low current state to its high current state and the triode continues in its high current state even after the triggering potential is removed. However, if the potential at the emitter input terminal be reduced so as to bring the crystal triode back into the current gain region, the collector current will fall and the feedback will be reduced. As in the reverse case described above, this action is cumulative, continuing until the crystal triode reaches the low current state, which it does via the current gain region. Hence it rapidly passes to the "off" condition as a result of a negative input potential and remains in the "off" condition when that negative potential is removed.

Each time that triggering occurs the crystal triode is operating in a very low current gain region of its characteristic. In each case the applied pulse must be of sufficient magnitude to take the crystal triode into the current gain portion of its characteristic. In both cases pulses of correct polarity for triggering but which are too small to put the emitter-base voltage in the current gain portion of the characteristic will not alter the condition of the crystal triode.

The value of the resistance included in the base circuit of the crystal triode, which includes the external base resistor connected to the triode is also of importance since it must be within a particular range of values for any particular crystal triode. However, as the range of values which will give suitable operation vary from one type of crystal triode to another, it is necessary to determine the optimum value for the external base resistor by experimental methods.

Figures 1, 3, 4, 5:
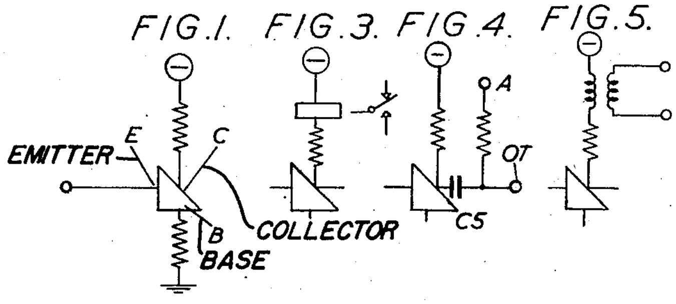
Fig. 1 is an explanatory diagram.
Figs. 3, 4 and 5 are circuits for giving an output when a particular crystal triode is in its "on" condition.

Fig. 2 shows a cumulative polynary countery using a number of crystal triodes, each arranged as in Fig. 1. The first crystal triode has its emitter connected to a point on a bleeder R1, R2 which biases it such that the crystal triode is just in its "off" condition. Each of the other crystal triodes has the bias for its emitter obtained from a bleeder which includes the collector circuit resistor of the preceding crystal triode. For instance, the emitter of CT2 is connected to the bleeder formed by R3, R4, R5, and the tap on the bleeder is such that the bias on the emitter of CT2 is a large negative potential.

Thus it will be seen that in the normal condition with all crystal triodes off, CT1 has a bias on its emitter electrode such that it is just maintained in the "off" state, while all the other crystal triodes have much larger negative biases on their emitter electrodes.

It will be assumed that the pulse supply to the circuit supplies narrow negative pulses to the input terminal PN. The first pulse is applied via condensers to the base electrodes of all crystal triodes. It will be appreciated that negative pulses applied to the base electrodes of the crystal triodes are equivalent to positive pulses applied to the emitter electrodes. Now the emitter bias of CT1 is less than that of any other crystal triode in the circuit, and hence the first impulse can only trigger CT1 to its "on," or high current, state.

When CT1 assumes its high current state, current flow in the collector circuit increases the potential at the junction of R3 and R4 in a positive direction, so that the potential at the junction of R4 and R5 is rendered more positive. Therefore the second pulse is able to trigger CT2. This process continues until on the *n*th pulse all *n* crystal triodes are in the "on" or high current state.

Clearly it is necessary to ensure that the bias on the emitter of a crystal triode does not reach the value which permits that crystal triode to be triggered during the duration of the pulse which triggers the preceding crystal triode. This is accomplished by making the input pulses of short duration, as has already been indicated, and by placing condensers C1, C2, etc. between the respective emitters and the negative supply point. Then when a crystal triode is triggered to its "on" state, the bias on the emitter of the next crystal triode rises slowly while the emitter condenser charges. The emitter of the first crystal triode still has a condenser between itself and the supply point to stabilize the bias voltage.

In some cases it is necessary to operate the counter from relatively long pulses, or pulses whose length may be indeterminate. These pulses are received on terminal PS, and are differentiated by the R-C circuit comprising R6, and the base resistor of a crystal triode, and the supply condenser of the crystal triode. The rectifier MR1 serves to suppress the positive going products of differentiation. Hence an applied negative going pulse is converted into a narrow negative pulse at its beginning and a narrow positive pulse at its trailing edge, the latter being suppressed. If a positive going pulse occurs, the narrow positive pulse is produced at the leading edge and the narrow negative pulse at the trailing edge, the narrow positive pulse being suppressed. Hence the counter will respond to positive or negative pulses applied to PS. Between pulses the charges accumulated on the condensers of these time constant circuits discharge via R6.

If the circuit is used to respond to negative pulses on PN, the PS input is either omitted or is used for the application of a "conditioning" input which can be used to disable or enable the circuit.

The counter is reset to "all off" by disconnecting and reconnecting the negative supply lead, or by applying a positive pulse in common to all collectors.

To detect the arrival of the *n*th pulse the *n*th tube has any one of the devices shown by way of example in Figs. 3, 4 and 5. Fig. 3 is a telephone-type relay forming part of the collector circuit. Fig. 4 shows an output via a condenser C5 via which a positive-going pulse is applied to output terminal OT. The point A is a point at a fixed negative potential. Fig. 5 shows a pulse-transformer forming part of the collector circuit of the crystal triode.

Figure 6:
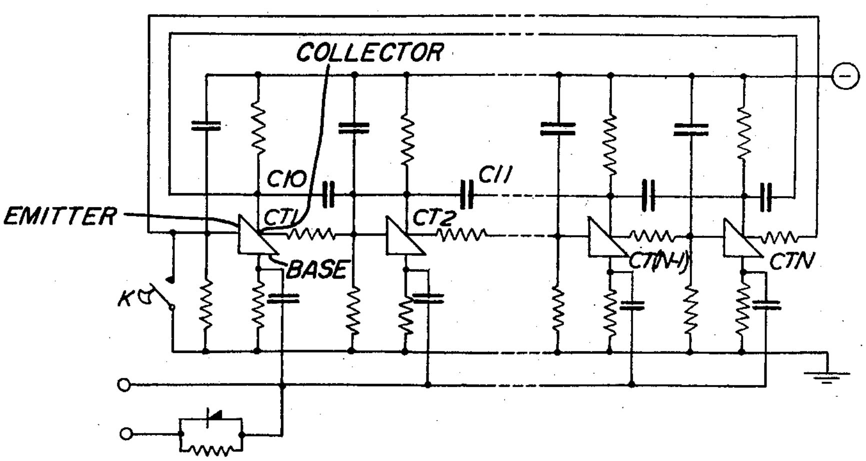
Fig. 6 is a second embodiment of the invention.

Fig. 6 is a counter which operates on principles the same as those of Fig. 2 except that each consecutive pair of crystal triodes have their collector electrodes coupled by condensers C10, C11, etc. Then, when a crystal triode is triggered to its "on" state, a positive pulse is applied to the collectors of all other crystal triodes. This pulse is greatest in magnitude at the adjacent triodes, so that the previously triggered triode is extinguished. Hence each pulse triggers the next crystal triode along from the previously triggered one and extinguishes the previously triggered crystal triode.

As can be seen, the last crystal triode is connected back to the first one, so this circuit is capable of continuous cycling operation.

To make the counter start at any one point, full earth is applied to the emitter of that crystal triode. Then the first negative pulse triggers that crystal triode. In Fig. 6 this has been represented by a key K connected to the emitter electrode of CT1. This key is reopened as soon as CT1 has triggered if continuous cycling of the circuit is desired.

While the principles of the invention have been described above in connection with specific embodiments, and particular modifications thereof, it is to be clearly understood that this description is made only by way of example and not as a limitation on the scope of the invention.

What is claimed is:

1. A circuit, as claimed in claim 5, and which comprises also a collector circuit for each said crystal triode; in which the "on" state of a crystal triode is a state in which the collector circuit thereof passes a high current and the "off" state is a state in which said collector circuit passes little or no current; in which said interconnecting means is a bleeder extending between said negative and positive power supply terminals and comprising a resistor connected between the emitter electrode of the second crystal triode of said pair and said positive supply terminal, a resistor connected between said emitter electrode and the collector electrode of the first triode of said pair, and a collector circuit resistor connected between said collector electrode of said first triode and said negative supply terminal, and in which the delaying means comprises a capacitor connected between said emitter electrode and one of said supply terminals; in which the resistors of said bleeder are so proportioned that when said first triode is in the "off" state, the bias potential on said emitter electrode of said second triode is so negative that said second triode cannot assume the "on" state in response to an applied pulse; and in which when said first triode assumes the "on" state, the high current flowing in said collector circuit resistor reduces the negative bias potential on said emitter electrode of said second triode to such a value that the next applied pulse operates said second triode to the "on" state, said reduction in bias potential being delayed by the charging time of said capacitor.

2. A circuit, as claimed in claim 1, and which comprises also a resistor between the base electrode of each said crystal triode and said positive supply terminal, and a capacitor connected between said common pulse input conductor and the base electrode of each said crystal triode.

3. A circuit, as claimed in claim 1, in which in the normal state thereof all said crystal triodes are in the "off" state, and which comprises also discriminating means whereby the first applied pulse operates a particular one of said crystal triodes to the "on" state.

4. A circuit, as claimed in claim 3, in which said particular crystal triode is the crystal triode for the first of said stages and in which said discriminating means comprises a connection from the emitter electrode of said particular crystal triode to a bias potential less negative than that normally connected to the emitter electrodes of the other crystal triodes.

5. An electrical pulse counting circuit comprising negative and positive power supply terminals, a plurality of counting stages, a single crystal triode for each said stage, each said crystal triode having a base electrode, an emitter electrode, and a collector electrode, and being so connected to said supply terminals as to be bistable, having an "on" state and an "off" state, a pulse input conductor over which pulses are applied in common to all said crystal triodes, means interconnecting the triodes of each pair of consecutive crystal triodes responsive to the first triode of said pair assuming the "on" state to prepare the second triode of said pair for operation from the "off" state to the "on" state in response to the next applied pulse, whereby each applied pulse causes the crystal triode following the last-operated crystal triode to assume the "on" state, said interconnecting means including means for delaying the preparing operation for a period of time greater than the duration of a pulse applied to said pulse input conductor, and further means interconnecting the triodes of each pair of consecutive crystal triodes responsive to the second triode of said pair assuming its "on" state to cause the first triode of said pair to return to its "off" state, said further means comprising a capacitor connected between the collector electrodes of each pair of consecutive crystal triodes.

6. A circuit as claimed in claim 5, in which said crystal triodes are so connected as to form a closed ring counter.

References Cited in the file of this patent

UNITED STATES PATENTS

| | | |
|---|---|---|
| 2,533,001 | Eberhard | Dec. 5, 1950 |
| 2,591,961 | Moore et al. | Apr. 8, 1952 |
| 2,594,336 | Mohr | Apr. 29, 1952 |
| 2,614,141 | Edson et al. | Oct. 14, 1952 |
| 2,644,897 | Lo | July 7, 1953 |
| 2,726,370 | Linville et al. | Dec. 6, 1955 |
| 2,791,644 | Sziklai | May 7, 1957 |